(12) United States Patent
Wilczek et al.

(10) Patent No.: US 9,006,322 B1
(45) Date of Patent: Apr. 14, 2015

(54) POLYOXYMETHYLENE COMPOSITIONS

(71) Applicant: E I du Pont de Nemours and Company, Wilmington, DE (US)

(72) Inventors: Lech Wilczek, Wilmington, DE (US); Ramabhadra Ratnagiri, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 14/248,617

(22) Filed: Apr. 9, 2014

(51) Int. Cl.
    *C08L 59/00* (2006.01)
    *C08L 83/04* (2006.01)

(52) U.S. Cl.
    CPC *C08L 59/00* (2013.01); *C08L 83/04* (2013.01)

(58) Field of Classification Search
None
See application file for complete search history.

(56) References Cited

U.S. PATENT DOCUMENTS

| | | | |
|---|---|---|---|
| 4,645,785 A | 2/1987 | Heinz et al. | |
| 4,647,609 A * | 3/1987 | O'Brien | 524/267 |
| 4,879,331 A * | 11/1989 | Endo et al. | 524/267 |
| 5,844,031 A | 12/1998 | Chen et al. | |
| 2006/0116486 A1 * | 6/2006 | Monma et al. | 525/398 |
| 2009/0143506 A1 * | 6/2009 | Harashina | 524/91 |

FOREIGN PATENT DOCUMENTS

| | | |
|---|---|---|
| EP | 0242037 | 10/1987 |
| JP | 07278407 | 10/1995 |
| JP | 08167688 | 6/1996 |

* cited by examiner

*Primary Examiner* — Marc Zimmer
(74) *Attorney, Agent, or Firm* — Loretta Smith; Otha Weaver

(57) ABSTRACT

Compositions comprising polyoxymethylene polymers and at least one organopolysiloxane polymer. Adding organopolysiloxane polymers to polyoxymethylene polymers provides compositions that exhibit at least a 50 percent reduction in melt viscosity compared to the melt viscosity of an identical, melted composition lacking the organopolysiloxane polymer, and promote easier molding of the compositions into complex article shapes.

14 Claims, No Drawings

POLYOXYMETHYLENE COMPOSITIONS

Described herein are thermoplastic compositions comprising polyoxymethylene and organopolysiloxane polymers, which exhibit reduced melt viscosity at elevated temperatures and shear stresses.

Effort is frequently given to refining manufacture of thermoplastic compositions in terms of reducing production cost and of making resultant articles having improved physical properties. One way to reduce production costs is to use additives that reduce the melt viscosity of the thermoplastic compositions as a function of temperature and shear in order to promote easier molding of the composition into complex article shapes, especially when the mold has long and narrow passages. Reduced melt viscosity improves flowability, that is, the melt flow, of the molten polymer into intricate mold shapes, with the following intended benefits of improving production quality and reducing waste. Additives known to reduce melt viscosity of thermoplastic compositions include silicone oils, amines, phthalates, epoxy compounds, fatty acid esters, and sulfonates. However, these additives have recognized limitations or do not provide sufficient reduction in melt viscosity.

There remains a need, during melt processing, to improve the melt flow of thermoplastic compositions comprising polyoxymethylene polymers to promote easier molding of the thermoplastic composition into complex article shapes.

To meet this need, described herein are compositions comprising:
(a) at least one polyoxymethylene polymer; and
(b) at least one organopolysiloxane polymer selected from the group consisting of:
(i) one or more polysiloxane homopolymers having as silane atom substituents at least one $C_2$ to $C_{20}$ alkyl group, or at least one aryl group, or any combination of these;
(ii) one or more polysiloxane copolymers having as silane atom substituents at least one $C_1$ to $C_{20}$ alkyl group, or at least one aryl group, or any combination of these;
(iii) one or more polyhydroxylsiloxane polymers; and
(iv) mixtures of any two or more of these;
wherein, when the composition is melted, the composition exhibits at least 50 percent reduction in melt viscosity compared to the melt viscosity of an identical, melted composition lacking component (b), with melt viscosity measured according to ASTM D-3835-08 at 220° C. and 500 sec$^{-1}$ shear rate.

It is the addition of the organopolysiloxane polymers to the compositions described herein that provides an unexpected decrease in the melt viscosity of the compositions.

Also described herein are methods of making these compositions and articles prepared from them.

ABBREVIATIONS

The claims and description herein are to be interpreted using the abbreviations and definitions set forth below.
"%" refers to the term percent.
"wt %" refers to weight percent
"sec" refers to seconds
"min" refers to minute
"g" refers to grams
"kg" refers to kilogram
"Pas·sec" refers to Pascal·seconds
"PolySi" refers to polysiloxane
"PolySi (Mn)" refers to the number average molecular weight of the polysiloxane.
"PolySi C/Si ratio" refers to the ratio of the number of carbon atoms to the number of silicon atoms in the polysiloxane

DEFINITIONS

The following definitions are to be used to interpret the meaning of the terms discussed in the description and recited in the claims.

As used herein, the article "a" indicates one as well as more than one and does not necessarily limit its referent noun to the singular.

As used herein, the terms "about" and "at or about" mean that the amount or value in question may be the value designated or some other value approximately or about the same. The term is intended to convey that similar values promote equivalent results or effects recited in the claims.

As used herein, the terms "comprises," "comprising," "includes," "including," "has," "having" or any other variation of these, refer to a non-exclusive inclusion. For example, a process, method, article, or apparatus that comprises a list of elements is not limited to only the listed elements but may include other elements not expressly listed or inherent. Further, unless expressly stated to the contrary, "or" refers to an inclusive, not an exclusive, or. For example, a condition A or B is satisfied by any one of the following: A is true (or present) and B is false (or not present), A is false (or not present) and B is true (or present), and both A and B are true (or present). As used herein, the terms "comprises," "comprising," "includes," "including," "has," "having", "consisting essentially of", and "consisting of" or any other variation of these, may refer either to a non-exclusive inclusion or to an exclusive inclusion.

When these terms refer to a non-exclusive inclusion, a process, method, article, or apparatus that comprises a list of elements is not limited to the listed elements but may include other elements not expressly listed or which may be inherent. Further, unless expressly stated to the contrary, "or" refers to an inclusive, not an exclusive, or. For example, a condition A or B is satisfied by any one of the following: A is true (or present) and B is false (or not present), A is false (or not present) and B is true (or present), and both A and B are true (or present).

When these terms refer to a more exclusive inclusion, these terms limit the scope of a claim to those recited materials or steps that materially affect the novel elements of the recited invention.

When these terms refer to a wholly exclusive inclusion, these terms exclude any element, step or component not expressly recited in the claim.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that will be included in a finished article and/or will undergo further processing in order to become a finished article. As used herein, when an article is finished, the term "article" refers to an item, thing, object, element, device, etc. that has undergone processing to completion to thereby be suitable for a particular use/purpose.

As used herein, the term "melt viscosity" refers to a measure of the ability of a thermoplastic polymer composition melt to flow. Melt viscosity is measured according to ASTM D-3835-08 at 220° C. and 500 sec$^{-1}$ shear rate. The units for melt viscosity are Pas·sec. The lower the melt viscosity value the better the ability of the thermoplastic composition to flow in the melt state.

As used herein, the terms "polyoxymethylene" and "polyoxymethylene polymer" refer to one or more homopolymers, copolymers, and mixtures of these, having a repeating unit of .$CH_2O$. The terminal groups of these polymers are derived by initiating, terminating, or chain-transferring groups, such as water or alcohols, or by chemical reaction, such as that resulting in ester or ether groups, including acetate, acetyl, alkyl or methoxy groups.

As used herein, the term "organopolysiloxane polymer" refers to polymers having a repeating unit of .$SiR_1R_2$—O. wherein at least one of $R_1$ and $R_2$ comprises at least one carbon atom. Examples of $R_1$ and $R_2$ include $C_1$ to $C_{20}$ alkyl groups, aryl groups, or any combination of these. Any carbon atom of $R_1$ and/or $R_2$ may be linear, branched, or cyclic, and can be substituted with hydroxyl, ether, or other functional group.

The commonly used chemical structure for an organopolysiloxane polymer is $R_3R_4R_5Si$—O—$(SiR_1R_2$—O—$)_x SiR_3R_4R_5$, where x is greater than 1 and wherein $R_3$, $R_4$, and $R_5$ may be hydrogen, hydroxyl, $C_1$ to $C_{20}$ alkyl, aryl, alkylaryl, alkylarylether, ether, polyalkylene ether, and any combination of these. The terminal groups are preferably either alkyl- or aryl-substituted silyl groups. Examples of terminal groups for the polysiloxane homopolymers and copolymers include trimethylsilyl, triethylsilyl, and triphenylsilyl groups, dimethylsilanol, diphenylsilanol, diethylsilanol, dimethylhydrosilane and are represented by —$SiR_3R_4R_5$ in the above chemical structure.

As used herein, the term "PolySi Carbon to Silicon ratio" or "carbon atom to silicon atom ratio" refers to ratio of the number of carbon atoms to the number of silicon atoms in the organopolysiloxane polymer. This ratio is 1 or more.

As used herein, the term "filler" refers to additives that generally retain their original, typically small, particle size upon both being added to the composition and processing of it into an article.

As used herein, the term "additives" as opposed to the fillers refers to those additional components that typically change their original size or form when mixed or processed with other components of the composition, for example by dissolving, solubilizing, emulsifying, or breaking up.

Ranges and Preferred Variants

Any range set forth herein includes its endpoints unless expressly stated otherwise. Setting forth an amount, concentration, or other value or parameter as a range specifically discloses all ranges formed from any pair of any upper range limit and any lower range limit, regardless of whether such pairs are separately disclosed herein. The processes and articles described herein are not limited to the specific values disclosed in defining a range in the description.

The disclosure herein of any variants in terms of materials, methods, steps, values, and/or ranges, etc.—whether identified as preferred variants or not—of the processes, compositions and articles described herein is specifically intended to disclose any process and article that includes ANY combination of such materials, methods, steps, values, ranges, etc. For the purposes of providing photographic and sufficient support for the claims, any such disclosed combination is specifically intended to be a preferred variant of the processes, compositions, and articles described herein.

DETAILED DESCRIPTION

Generally

Described herein are compositions having an organopolysiloxane polymer additive, which exhibit at least 50% reduction in melt viscosity compared to the melt viscosity of an identical composition lacking the organopolysiloxane polymer additive. These compositions described herein comprise:
(a) at least one polyoxymethylene polymer; and
(b) at least one organopolysiloxane polymer selected from the group consisting of:
(i) one or more polysiloxane homopolymers having as silane atom substituents at least one $C_2$ to $C_{20}$ alkyl group, or at least one aryl group, or any combination of these;
(ii) one or more polysiloxane copolymers having as silane atom substituents at least one $C_1$ to $C_{20}$ alkyl group, or at least one aryl group, or any combination of these;
(iii) one or more polyhydroxylsiloxane polymers; and
(iv) mixtures of any two or more of these;
wherein, when the composition is melted, the composition exhibits at least 50 percent reduction in melt viscosity compared to the melt viscosity of an identical, melted composition lacking component (b), with melt viscosity measured according to ASTM D-3835-08 at 220° C. and 500 $sec^{-1}$ shear rate.

Also described herein are processes to prepare the compositions and articles prepared from them.

The compositions described herein include all possible variations when the polyoxymethylene polymer is selected from the group consisting of polyoxymethylene homopolymers, polyoxymethylene copolymers, and mixtures of these. The polyoxymethylene polymer ranges preferably from 60 to 99.5 weight percent, more preferably from 80 to 93 weight percent polyoxymethylene polymer, and even more preferably from 90 to 95 weight percent of the total weight of the compositions described herein.

Moreover, in any variation of these compositions, the at least one organopolysiloxane polymer may be selected from the group consisting of:
(i) one or more polysiloxane homopolymers having as silane atom substituents at least one $C_2$ to $C_{20}$ alkyl group, or at least one aryl group, or any combination of these;
(ii) one or more polysiloxane copolymers having as silane atom substituents at least one $C_1$ to $C_{20}$ alkyl group, or at least one aryl group, or any combination of these;
(iii) one or more polyhydroxylsiloxane polymers; and
(iv) mixtures of any two or more of these;

The organopolysiloxane polymer ranges from 0.1 to 5 weight percent, more preferably from 0.5 to 5 weight percent, and even more preferably from 1.5 to 2.5 weight percent, of the total weight of the compositions described herein.

In addition, any variation of the compositions described herein may have up to 40 weight percent of at least one filler and/or additive. Also described herein are articles formed from any variation of these compositions.

The compositions described herein exhibit a reduction in melt viscosity of at least 50 percent, preferably at least 55 percent, and more preferably at least 60 percent, when compared to the melt viscosity of an identical composition lacking the organosilane additives, with the melt viscosity measured according to ASTM D-3835-08 at 220° C. and 500 $sec^{-1}$ shear rate. The compositions described herein solve the technical problem of providing a reduction in melt viscosity, which facilitates the melt flow of these compositions during molding and, thus, the molding of thinner, more intricate articles. Ultimately, this improved molding precision reduces the manufacture of non-conforming articles and reduces production waste.

Compositions Described Herein a) Polyoxymethylene Polymer

The polyoxymethylene polymers used in the compositions described herein include homopolymers, copolymers and mixtures of these. Polyoxymethylene homopolymers include homopolymers of formaldehyde or cyclic oligomers of formaldehyde, e.g., trioxane and tetraoxane.

Polyoxymethylene copolymers include copolymers of formaldehyde or cyclic oligomers of formaldehyde and monomers that yield oxyalkylene groups having at least two adjacent carbon atoms in the polymer chain. Also included are other monomers that yield oxyalkylene groups having at least two adjacent carbon atoms in the polymer chain.

Comonomers commonly used in preparing polyoxymethylene copolymers include those without alkylene oxides and those with alkylene oxides of 2-12 carbon atoms and their cyclic addition products with formaldehyde. The comonomer generally is not more than about 20 weight percent, preferably not more than about 15 weight percent, and most preferably about 2 weight percent, of the total weight of the polyoxymethylene polymer.

The polyoxymethylene polymers in the compositions described herein can be characterized by polymer melt flow rate, which ranges from any decimal value from 0.1 g/10 min. up to and including 50 g/10 min., preferably from 0.1 g/10 min. to 30 g/10 min when measured according to ISO 1133 method at 190° C. and 2.16 kg.

b) Organopolysiloxane Polymers

The organopolysiloxane polymers in these compositions are selected from the group consisting of:
(i) polysiloxane homopolymers having as silane atom substituents a $C_2$ to $C_{20}$ alkyl group, or at least one aryl group, or combinations of these;
(ii) polysiloxane copolymers having as silane atom substituents a $C_1$ to $C_{20}$ alkyl group, or at least one aryl group, or combinations of these;
(iii) polyhydroxylsiloxane polymers; and
(iv) mixtures of any two or more of these.

Because of the added organopolysiloxane polymers, the compositions described herein, when melted, exhibit a reduced melt viscosity by at least 50 percent at elevated temperatures and shear stresses, compared to the melt viscosity of an identical melted thermoplastic composition lacking the organopolysiloxane polymer(s). The number average molecular weights (Mn) of the organopolysiloxane polymers ranges from less than about 800 to about 40,000.

It is important that no substituent of the monomers of the organopolysiloxane polymers described herein is a halogen atom or a carboxyl group.

(b)(i) Polysiloxane Homopolymers

The organopolysiloxane polymers used as additives in the compositions described herein may include polysiloxane homopolymers in which the substituents on the silane atom of the polysiloxane homopolymer are at least one $C_2$ to $C_{20}$ alkyl group, or at least one aryl group, or any combination of these. Thus, to be clear, polysiloxane homopolymers include polyalkylsiloxanes that have two $C_2$ to $C_{20}$ alkyl groups as substituents on the siloxane atom or polyalkylsiloxanes having a combination of one $C_2$ to $C_{20}$ alkyl and one aryl group as substituents on the siloxane atom, as well as polyarylsiloxanes having two aryl groups as substituents on the siloxane atoms of the homopolymer. The $C_2$ to $C_{20}$ alkyl or aryl substituents can the same or can be different. The alkyl substituent may be linear, cyclic, or branched, or itself substituted with aromatic substituents. That is, any combination of alkyl and aryl substituents on the siloxane atoms of the polysiloxane homopolymer is contemplated herein. Non-limiting examples of polysiloxane homopolymers include polymethyethylsiloxane, polydiethylsiloxane, polydipropylsiloxane, polytetradecylmethylsiloxane, polyoctadecylmethylsiloxane, polyoctylmethylsiloxane, polydecylmethylsiloxane, polyphenylmethylsiloxane, polyphenylethylsiloxane, polyphenyloctylsiloxane, polyphenyldecylsiloxane, polyphenyloctadecylsiloxane, polydiphenylsiloxane, and poly(2-phenylpropyl)methylsiloxane.

Each monomer making up the polysiloxane homopolymers described herein has the same silane atom substituents. For example, for a monomer or repeat unit comprising an octyl substituent and a methyl substituent attached to the silane atom of the monomer or repeat unit used to prepare a polysiloxane homopolymer, then all monomers or repeat units of that specific polysiloxane homopolymer comprise an octyl substituent and a methyl substituent on the silane atom of the repeat unit. That is, all the silane atoms in a polysiloxane homopolymer have the same substituents with the possible exception of the silane atoms in the optional terminal group of the polymer chain, which may comprise different substituents.

The number average molecular weight (Mn) of the polysiloxane homopolymers ranges from about 1500 to about 25,000.

(b)(ii) Polysiloxane Copolymers

Besides component (b)(i) described above, the organopolysiloxane polymers described herein may be or include polysiloxane copolymers in which at least two different siloxane monomers or repeat units are polymerized to obtain polysiloxane copolymers. Such siloxane monomers or repeat units may include the same repeat unit as in component (b)(i) above, so long as at least two different repeat units are used to prepare the polysiloxane copolymer. The siloxane repeat units of the polysiloxane copolymers comprise at least one $C_1$ to $C_{20}$ alkyl and/or aryl group as a substituent on the silane atom of the repeat unit. Polysiloxane copolymers may have siloxane monomers that have two $C_1$ to $C_{20}$ alkyl substituents attached to the siloxane atom of the monomer or siloxane monomers having one $C_1$ to $C_{20}$ alkyl and one aryl group attached to the siloxane atom of the monomer, or siloxane monomers having two aryl groups attached to the siloxane atom of the siloxane monomer. The alkyl or aryl substituents may be the same or different. The alkyl substituent may be linear, cyclic, or branched. Any combination of alkyl and aryl substituents on the siloxane monomer may be used as long as the polysiloxane copolymers have at least two different siloxane monomers.

Non-limiting examples of polysiloxane copolymers include dodecylmethylsiloxane-(2-phenylpropyl)methylsiloxane copolymer, hexadecylmethylsiloxane-dimethylsiloxane copolymer, octadecylmethylsiloxane-dimethylsiloxane copolymer, (silethylphenylene)(dimethylsiloxane) copolymer, diphenylsiloxane-dimethylsiloxane copolymer, hex methylsiloxane-dimethylsiloxane copolymer, hex, methylsiloxane-(2-phenylpropyl)methylsiloxane copolymer, phenylmethylsiloxane-dimethylsiloxane copolymer, and combinations thereof. The organopolysiloxane copolymers may be random or block copolymers, as well as polysiloxane terpolymers and tetrapolymers.

The polysiloxane homopolymers of (b)(i) and the copolymers of component (b)(ii) may be terminated with at least one terminal siloxane group. Terminal siloxane groups are represented by general formula (I):

(I)

wherein $R_1$, $R_2$, and $R_3$ may be hydrogen, hydroxyl, $C_1$ to $C_{20}$ alkyl, aryl, alkylaryl, alkylarylether, ether, polyalkylene ether, and any combination of these. The terminal groups are preferably either alkyl- or aryl-substituted silyl groups. Examples of terminal groups for the polysiloxane homopolymers and copolymers include trimethylsilyl, triethylsilyl, and triphenylsilyl groups, dimethylsilanol, diphenylsilanol, diethylsilanol, dimethylhydrosilane.

The number average molecular weight (Mn) of the polysiloxane copolymers ranges from about 1200 to about 38,000.

When component (b)(ii) is present in the composition, the carbon atom to silicon atom ratio (C/Si) of component (b)(ii) ranges from about 2 to 20.

(b)(iii) Polyhydroxylsiloxane Polymers

The organopolysiloxane polymers added to the compositions described herein may be or include polyhydroxylsiloxane polymers. Polyhydroxylsiloxane polymers may contain the same siloxane monomers of component (b)(i), the polysiloxane homopolymers, and of component (b)(ii), the polysiloxane copolymers. The polyhydroxylsiloxane polymers may be homopolymers or copolymers as well as either random or block polymers. The substituent of the siloxane atom of the siloxane monomer may comprise one or more hydroxyl groups.

The polyhydroxylsiloxane polymers of component (b)(iii) may be terminated with at least one terminal siloxane group represented by general formula (I) wherein $R_1$, $R_2$, and $R_3$ can be hydrogen, $C_1$ to $C_{20}$ alkyl, aryl, alkylaryl, alkylarylether, ether, polyalkylene ether, hydroxy groups and any combination of these. The $C_1$ to $C_{20}$ alkyl, aryl, alkylaryl, alkylarylether, ether, polyalkylene ether groups may also include a hydroxyl group as part of the substituent.

The polyhydroxylsiloxane polymers described herein comprise at least one hydroxyl group, which may be a part of a substituent of the silane atom or part of the terminal siloxane group, if present, or both.

Non-limiting examples of organopolysiloxane polymers in these compositions herein include poly(hexylmethylsiloxane) homopolymer, poly(pentylmethylsiloxane) homopolymer, poly(propylmethylsiloxane) homopolymer, poly(decylmethylsiloxane) homopolymer, poly(dodecylmethylsiloxane) homopolymer, poly(octadecylmethylsiloxane) homopolymer, poly(tetradecylmethylsiloxane) homopolymer, poly(octamethylsiloxane) homopolymer, hexylmethylsiloxane-(2-phenylpropyl)methylsiloxane copolymer, dodecylmethylsiloxane-(2-phenylpropyl)methylsiloxane copolymer, dimethylsiloxane-diphenylsiloxane copolymer, phenylmethylsiloxane-dimethylsiloxane copolymer, phenylmethylsiloxane-dimethylsiloxane copolymer (triethylsiloxy terminated), hexadecylmethylsiloxane-dimethylsiloxane copolymer, octadecylmethylsiloxane-dimethylsiloxane copolymer, hydroxypolyethylenoxy functional methylsiloxane-(3,4-dimethoxyphenylpropyl)methylsiloxane-dimethylsiloxane terpolymer, polydimethylsiloxane (carbinol terminated), polydimethylsiloxane (carbinol terminated), [hydroxy(polyethyleneoxy)propyl]methylsiloxane-dimethylsiloxane copolymer, silethylphenylene)(dimethylsiloxane) copolymer.

Fillers and/or Additives

The compositions described herein may include fillers, which include, but are not limited to, glass, including fibers; calcium carbonate; oxides such as alumina, silica, and titanium dioxide; sulfates such as barium sulfate; titanates; kaolin clay and other silicates; magnesium hydroxide; talc; wollastonite; minerals; reinforcing agents; inorganic and organic pigments; graphite; carbon fiber; and carbon black.

Additives that are not fillers include, but are not limited to, polymers; resins; stabilizers, such as polyurethane; modifiers; co-stabilizers; processing stabilizers; heat stabilizers; weather (light-resistant) stabilizer; antioxidants; colorants; UV stabilizers; toughening agents; nucleating agents; lubricants; mold release agents; plasticizers; antistatic agents; and surfactants. See U.S. Pat. Nos. 3,960,984; 4,098,843; 4,766,168; 4,814,397; 5,011,890; 5,063,263; and 5,318,813.

The compositions described herein may further comprise any weight percent, either with or without a decimal component of the fillers and additives disclosed herein or known in the art, either singularly or in any combination, ranging from 0 to 40 weight percent. It is expressly contemplated herein that these compositions herein may comprise any weight percent, either with or without a decimal component, from 0 to 30 weight percent of fillers and any weight percent, either with or without a decimal component, up to 10 weight percent of additives. Additives that do not adversely affect the melt viscosity of these compositions are preferred.

Making Compositions Described Herein and Articles from them

The compositions described herein are melt-mixed blends, wherein all the polymeric components are well-dispersed within each other and all the non-polymeric ingredients are well-dispersed in and bound by the polymer matrix, such that the blend forms a unified whole. They are made by blending the components in any order or combination, at any convenient temperature, such as ambient, or after heating the components at from 170° C. to 240° C., and preferably from about 190° C. to 220° C., when some components will be fluid.

Any melt-mixing method may be used to combine the polymeric components and non-polymeric components. For example, the polymeric components and non-polymeric ingredients may be added to a melt mixer, such as a single or twin-screw extruder; a blender; a single or twin-screw kneader; or a Banbury mixer, either all at once in a single step addition, or sequentially in a stepwise fashion, and then melt-mixed. When adding the polymeric components and non-polymeric ingredients in a stepwise fashion, part of the polymeric components and/or non-polymeric ingredients are typically first added and melt-mixed, and then the remaining polymeric components and non-polymeric ingredients are subsequently added and further melt-mixed to obtain a well-mixed composition. When long fillers such as long glass fibers are used in the composition, pultrusion may be used to prepare a reinforced composition. Pellets of these compositions can be made.

The compositions described herein may be shaped into articles using methods known to those skilled in the art, such as injection molding, blow molding, injection blow molding, extrusion, thermoforming, melt casting, vacuum molding, rotational molding, calendar molding, slush molding, filament extrusion and fiber spinning. Such articles may include films, fibers and filaments; wire and cable coating; photovoltaic cable coating, optical fiber coating, tubing and pipes; fabrics, nonwovens or textiles made from fibers and filaments, e.g., used in clothing or carpets; films and membranes, such as breathable membranes in roofing and building/construction; motorized vehicles parts such as body panels, dashboards; components for household appliances, such as washers, dryers, refrigerators and heating-ventilation-air conditioning appliances; connectors in electrical/electronic applications; components for electronic devices, such as computers; components for office-, indoor-, and outdoor-furniture; a gear; a conveyor belt part; a bearing; a container for fuel; a part for an automotive safety restraint system; a pharmaceutical dispenser; a medical injection device; a clamp; a clasp; a binding; and a part for a lighter.

The compositions described herein are useful for making articles from molds that have at least one long and/or narrow channel that requires a molten polymer having a viscosity of less than about 450 Pa·sec, preferably less than about 410 Pa·sec.

EXAMPLES

The Examples (E) and Comparative Examples (C) below are intended only to further explicate and not to limit the scope of the compositions and articles described herein.

Methods

Melt Viscosity

Melt viscosity of the compositions described herein is measured according to ASTM D-3835-08 at 220° C. and 500 sec$^{-1}$ shear rate.

Viscosity Reduction

Viscosity reduction of the compositions described herein is calculated by comparing the melt viscosity of a composition comprising at least one of organopolysiloxane polymers described herein and any optional fillers and/or additives to the melt viscosity of an identical composition but lacking any organopolysiloxane polymer described herein, with the melt viscosity of each composition measured under the same conditions. The percent of reduction in melt viscosity for each example and each comparative example has been calculated relative to the melt viscosity of the same composition but lacking that relevant component whose effect on melt viscosity is being demonstrated.

Materials

POM—A polyoxymethylene homopolymer, with melting point of 178° C. available as Delrin® from E. I. du Pont de Nemours & Co., Inc., Wilmington, Del., USA.

MAP—80% polyacrylamide with CAS Registry Number [9003-05-8], coated with 20% polyethylene glycol available from BASF Corporation.

6B—a polyamide thermal stabilizer, is a terpolymer of polyamide 6-6/6-10/6 with a melting point of 160 C, obtained from E.I. du Pont de Nemours and Company, Inc, Wilmington, Del., USA.

PolySi-A—A polydimethylsiloxane having a molecular weight (Mn) of 77,000 and a viscosity of 18,000 cSt available as DMS-S42 from Gelest, Inc., Morrisville, Pa., USA.

PolySi-B—A dimethylsiloxane-caprolactone block copolymer having a molecular weight (Mn) of 6,500 available as DBL-C31 from Gelest, Inc., Morrisville, Pa., USA.

PolySi-C—A polydimethylsiloxane having a molecular weight (Mn) of 77,000, available as DMS-S51 from Gelest, Inc., Morrisville, Pa., USA.

PolySi-D—A fluorinated polysiloxane having a molecular weight (Mn) of 10,000, available as FMS-141 from Gelest, Inc., Morrisville, Pa., USA.

PolySi-E—A poly(methylhydrosiloxane) having a molecular weight (Mn) of 2,200 and a viscosity of 30-45 cSt, available as HMS-993 from Gelest, Inc., Morrisville, Pa., USA.

PolySi-1—A hexylmethylsiloxane-(2-phenylpropyl)methylsiloxane copolymer having a molecular weight (Mn) of 2,200 and a viscosity of 1000-2000 cSt, available as APT-233 from Gelest, Inc., Morrisville, Pa., USA.

PolySi-2—A dodecylmethylsiloxane-(2-phenylpropyl)methylsiloxane copolymer having a molecular weight (Mn) of 35.000 and a viscosity of 1000-2000 cSt, available as APT-263 from Gelest, Inc., Morrisville, Pa., USA.

PolySi-3—A dimethylsiloxane-diphenylsiloxane copolymer having a molecular weight (Mn) of 2,000 and a viscosity of 150-250 cSt, available as PDM-1922 from Gelest, Inc., Morrisville, Pa., USA.

PolySi-4—A phenylmethylsiloxane-dimethylsiloxane copolymer having a molecular weight (Mn) of 2000-2200 and a viscosity of 125 cSt, available as PMM-5021 from Gelest, Inc., Morrisville, Pa., USA.

PolySi-5—A polydiethylsiloxane, triethylsiloxy terminated, having a molecular weight (Mn) of 1300-2000 and a viscosity of 200 cSt, available as DES-T23 from Gelest, Inc., Morrisville, Pa., USA.

PolySi-6—A poly(ethylene oxide)propylmethylsiloxane-dimethylsiloxane copolymer having a molecular weight (Mn) of 5500-6500 and a viscosity of 150-200 cSt, available as CMS-222 from Gelest, Inc., Morrisville, Pa., USA.

PolySi-7—A poly(tetradecylmethylsiloxane) homopolymer having a molecular weight (Mn) of about 20,000 and a viscosity of 500-1500 cSt, available as ALT-173 from Gelest, Inc., Morrisville, Pa., USA.

PolySi-8—A poly(octamethylsiloxane) homopolymer having a molecular weight (Mn) of about 20,000 and a viscosity of 500-1000 cSt, available as ALT-143 from Gelest, Inc., Morrisville, Pa., USA.

PolySi-9—A hexadecylmethylsiloxane-dimethylsiloxane copolymer having a molecular weight (Mn) of about 1,500 and a viscosity of 40-70 cSt, available as ALT-281 from Gelest, Inc., Morrisville, Pa., USA.

PolySi-10—A poly(octadecylmethylsiloxane) having a molecular weight (Mn) of about 20,000 and a viscosity of 200-500 cSt at 50 C, available as ALT-192 from Gelest, Inc., Morrisville, Pa., USA.

PolySi-11—A octadecylmethylsiloxane-dimethylsiloxane copolymer having a molecular weight (Mn) of about 5,000 and a viscosity of 200-350 cSt at 50 C, available as ALT-292 from Gelest, Inc., Morrisville, Pa., USA.

PolySi-12—A hydroxypolyethylenoxy functional methylsiloxane-(3,4-dimethoxyphenylpropyl)methylsiloxane-dimethylsiloxane terpolymer having a viscosity of 1000-2000 cSt, available as CMS-832 from Gelest, Inc., Morrisville, Pa., USA.

PolySi-13—A polydimethylsiloxane, carbinol terminated, having a molecular weight (Mn) of 3,000 and a viscosity of 200-300 cSt, available as DBP-C22 from Gelest, Inc., Morrisville, Pa., USA.

PolySi-14—A ethylene oxide-dimethylsiloxane-ethylene oxide block copolymer, having a molecular weight (Mn) of 3,500-4,500 and a viscosity of 400-450 cSt, available as DBE-C25 from Gelest, Inc., Morrisville, Pa., USA.

PolySi-15—A polydimethylsiloxane, carbinol terminated, having a molecular weight (Mn) of 1,000 and a viscosity of 30-50 cSt, available as DMS-C15 from Gelest, Inc., Morrisville, Pa., USA.

PolySi-16—A [hydroxy(polyethyleneoxy)propyl]methylsiloxane-dimethylsiloxane copolymer, having a molecular weight (Mn) of 5,000 and a viscosity of 550-650 cSt, available as CMS-626 from Gelest, Inc., Morrisville, Pa., USA.

PolySi-17—A (silethylphenylene)(dimethylsiloxane) copolymer, having a molecular weight (Mn) of 5,500 and a viscosity of 300-600 cSt, available as DCS-8024 from Gelest, Inc., Morrisville, Pa., USA.

PolySi-18—A ethylene oxide-dimethylsiloxane-ethylene oxide block copolymer, having a molecular weight (Mn) of 3500-4500 and a viscosity of 400-450 cSt, available as DBE-C25 from Gelest, Inc., Morrisville, Pa., USA.

In Table 1, comparative examples C1 and C3 comprise polyoxymethylene and polydimethylsiloxane homopolymers of different molecular weights and exhibit a reduction of melt viscosity of less than 50 percent compared with that of the control composition. The polydimethylsiloxane homopolymers of both C1 and C3 comprise $C_1$ alkyl groups attached to the silane atom of the monomer used to prepare the homopolymer. C2 comprises a polysiloxane comprising a carboxyl group; C4 comprises a halogenated polysiloxane and. Both C2 and C4 also exhibit a reduction of melt viscosity of less than 50 percent compared with that of the control composition. C5 comprises a polysiloxane copolymer in which a monomer comprises hydrogen as a substituent and exhibits a reduction of melt viscosity of less than 50 percent compared with that of the control composition.

TABLE 1

| Ingredients | Control | C1 | C2 | C3 | C4 | C5 |
|---|---|---|---|---|---|---|
| POM A | 98 | | | | | |
| MAP | 1.0 | 1.0 | 1.0 | 1.0 | 1.0 | 1.0 |
| 6B | 1.0 | 1.0 | 1.0 | 1.0 | 1.0 | 1.0 |
| PolySi-A ($C_1$ alkyl group) | 0 | 2.0 | | | | |
| PolySi-B (carboxyl group) | 0 | | 2.0 | | | |
| PolySi-C ($C_1$ alkyl group) | 0 | | | 2.0 | | |
| PolySi-D (halogenated) | 0 | | | | 2.0 | |
| PolySi-E (copolymer with H) | 0 | | | | | 2.0 |
| Physical Properties | | | | | | |
| PolySi (Mn) | — | 18,000 | 6,500 | 77,000 | 10,000 | 2,200 |
| PolySi C/Si ratio | — | 2 | 8 | 2 | 4 | 1.2 |
| Viscosity (Pa·sec) | 809 | 555 | 551 | 488 | 479 | 474 |
| Percent Reduction of Melt Viscosity | N/A | 31 | 32 | 39 | 41 | 41 |

E1 to E5 in Table 2 comprise polysiloxane copolymers in which the substituents on the silane atom of the monomer of the polysiloxane copolymer include at least one $C_1$-$C_{20}$ alkyl or aryl group. E6 comprises a polyoxymethylene and a polyhydroxylsiloxane polymer. E1 to E6 each has at least a 50 percent reduction in melt viscosity compared to the Control in Table 1.

TABLE 2

| Ingredients | E1 | E2 | E3 | E4 | E5 | E6 |
|---|---|---|---|---|---|---|
| POM-A | | | | | | |
| MAP | 1.0 | 1.0 | 1.0 | 1.0 | 1.0 | 1.0 |
| 6B | 1.0 | 1.0 | 1.0 | 1.0 | 1.0 | 1.0 |
| PolySi-1 | 2.0 | | | | | |
| PolySi-2 | | 2.0 | | | | |
| PolySi-3 | | | 2.0 | | | |
| PolySi-4 | | | | 2.0 | | |
| PolySi-5 | | | | | 2.0 | |
| PolySi-6 | | | | | | 2.0 |
| Physical Properties | | | | | | |
| PolySi (Mn) | 35,000 | 35,000 | 2,000 | 2,100 | 1,700 | 6,000 |
| PolySi C/Si Ratio | 8.5 | 12.1 | 4 | 4.5 | 4 | 3 |
| Viscosity (Pa·sec) | 406 | 389 | 388 | 382 | 380 | 379 |
| Percent Reduction of Melt Viscosity (%) | 50 | 52 | 52 | 53 | 53 | 53 |

Table 3 includes different kinds of the recited organopolysiloxane polymers. Importantly, since each example in Table 3 exhibits at least a 50 percent reduction in melt viscosity, Table 3 more fully demonstrates that the variation in organopolysiloxane polymers that can achieve the recited reduction in melt viscosity. Specifically, E7, E8 and E10 comprise polysiloxane homopolymers and E9 and E11 comprise polysiloxane copolymers. E12 comprises a polyhydroxylsiloxane polymer.

TABLE 3

| Ingredients | E7 | E8 | E9 | E10 | E11 | E12 |
|---|---|---|---|---|---|---|
| POM-A | | | | | | |
| MAP | 1.0 | 1.0 | 1.0 | 1.0 | 1.0 | 1.0 |
| 6B | 1.0 | 1.0 | 1.0 | 1.0 | 1.0 | 1.0 |
| PolySi-7 | 2.0 | | | | | |
| PolySi-8 | | 2.0 | | | | |
| PolySi-9 | | | 2.0 | | | |
| PolySi-10 | | | | 2.0 | | |
| PolySi-11 | | | | | 2.0 | |
| PolySi-12 | | | | | | 2.0 |
| Physical Properties | | | | | | |
| PolySi (Mn) | 20,000 | 20,000 | 1,500 | 20,000 | 5,000 | 35,000 |
| PolySi C/Si Ratio | 15 | 4.5 | 9 | 19 | 7.1 | 4 |
| Viscosity (Pas·sec) | 375 | 375 | 373 | 341 | 341 | 335 |
| Percent Reduction of Melt Viscosity (%) | 53 | 53 | 54 | 58 | 58 | 58 |

Each example in Table 4 exhibit the recited reduction of melt viscosity, i.e., at least 50 percent, for different kinds of organopolysiloxanes as additives to the compositions described herein. Specifically, E13 to E16 and E18 comprise a polyhydroxylsiloxane polymer; E17 comprises a block polysiloxane copolymer. Thus, Table 4 furthers the demonstration of the variety of organopolysiloxane polymers that achieve the recited reduction in melt viscosity

TABLE 4

| Ingredients | E13 | E14 | E15 | E16 | E17 | E18 |
|---|---|---|---|---|---|---|
| POM-A | | | | | | |
| MAP | 1.0 | 1.0 | 1.0 | 1.0 | 1.0 | 1.0 |
| 6B | 1.0 | 1.0 | 1.0 | 1.0 | 1.0 | 1.0 |
| PolySi-13 | 2.0 | | | | | |
| PolySi-14 | | 2.0 | | | | |
| PolySi-15 | | | 2.0 | | | |
| PolySi-16 | | | | 2.0 | | |
| PolySi-17 | | | | | 2.0 | |
| PolySi-18 | | | | | | 2.0 |
| Physical Properties | | | | | | |
| PolySi (Mn) | 3,000 | 4,000 | 1,000 | 5,000 | 5,500 | 4,000 |
| PolySi C/Si Ratio | 3.5 | 4 | 3 | 4 | 3 | 5 |
| Viscosity (Pas·sec) | 329 | 327 | 322 | 320 | 310 | 280 |
| Viscosity Reduction (%) | 59 | 59 | 60 | 60 | 62 | 65 |

The invention claimed is:

1. A composition comprising:
   (a) at least one polyoxymethylene polymer; and
   (b) at least one organopolysiloxane polymer selected from the group consisting of:
      (i) one or more polysiloxane homopolymers having as silicon atom substituents at least one $C_2$ to $C_{20}$ alkyl group, or at least one aryl group, or any combination of these;
      (ii) one or more polysiloxane copolymers having as silicon atom substituents at least one $C_1$ to $C_{20}$ alkyl group, or at least one aryl group, or any combination of these;
      (iii) one or more polyhydroxylsiloxane polymers; and
      (iv) mixtures of any two or more of these;
   wherein, when the composition is melted, the composition exhibits at least 50 percent reduction in melt viscosity compared to the melt viscosity of an identical, melted composition lacking component (b), with melt viscosity measured according to ASTM D-3835-08 at 220° C. and 500 $sec^{-1}$ shear rate.

2. The composition of claim 1, comprising 0.5 to 5 weight percent of the organopolysiloxane polymer.

3. The composition of claim 1, comprising 1.5 to 2.5 weight percent of the organopolysiloxane polymer.

4. The composition of claim 1, comprising 60 to 99.5 wt. % of the polyoxymethylene polymer.

5. The composition of claim 1, wherein, when the composition comprises component (b)(i), number average molecular weight (Mn) of component (b)(i) ranges from about 1500 to about 25,000.

6. The composition of claim 1, wherein, when the composition comprises component (b)(i), carbon atom to silicon atom ratio (C/Si) of component (b)(i) ranges from about 4 to 20.

7. The composition of claim 1, wherein when the composition comprises component (b)(i), the reduction in melt viscosity ranges from at least 50% to about 60%, when compared to the melt viscosity of an identical, melted composition lacking component (b).

8. The composition of claim 1, wherein, when the composition comprises component (b)(ii), number average molecular weight (Mn) of component (b)(ii) ranges from about 1200 to about 38,000.

9. The composition of claim 1, wherein, when the composition comprises component (b)(ii), the carbon atom to silicon atom ratio (C/Si) of component (b)(ii) ranges from about 2 to 20.

10. The thermoplastic composition of claim 1, wherein, when the composition comprises component (b)(ii), the reduction in melt viscosity ranges from at least 50% to about 65%, when compared to the melt viscosity of an identical, melted composition lacking component (b).

11. The thermoplastic composition of claim 1, wherein, when the composition comprises component (b)(iii), number average molecular weight (Mn) of component (b)(iii) ranges from about 800 to about 38,000.

12. The thermoplastic composition of claim 1, wherein, when the composition comprises component (b)(iii), carbon atom to silicon atom ratio (C to Si) of component (b)(iii) ranges from about 2 to 6.

13. The composition of claim 1, wherein, when the composition comprises component (b)(iii), the reduction in melt viscosity ranges from at least 50% to about 65%, when compared to the melt viscosity of an identical, melted composition lacking component (b).

14. An article comprising a composition comprising:
  (a) at least one polyoxymethylene polymer; and
  (b) at least one organopolysiloxane polymer selected from the group consisting of:
    (i) one or more polysiloxane homopolymers having as silicon atom substituents at least one $C_2$ to $C_{20}$ alkyl group, or at least one aryl group, or any combination of these;
    (ii) one or more polysiloxane copolymers having as silicon atom substituents at least one $C_1$ to $C_{20}$ alkyl group, or at least one aryl group, or any combination of these;
    (iii) one or more polyhydroxylsiloxane polymers; and
    (iv) mixtures of any two or more of these;
  wherein, the composition is melted, reduction in melt viscosity of the composition is at least 50 percent compared to the melt viscosity of an identical, melted composition lacking component (b), with melt viscosity measured according to ASTM D-3835-08 at 220° C. and 500 $sec^{-1}$ shear rate.

* * * * *